Nov. 24, 1936.  A. W. KATH  2,061,968
METHOD AND APPARATUS FOR COMBINING WRAPPERS AND BANDS FOR CIGARS
Filed March 27, 1933  9 Sheets-Sheet 6
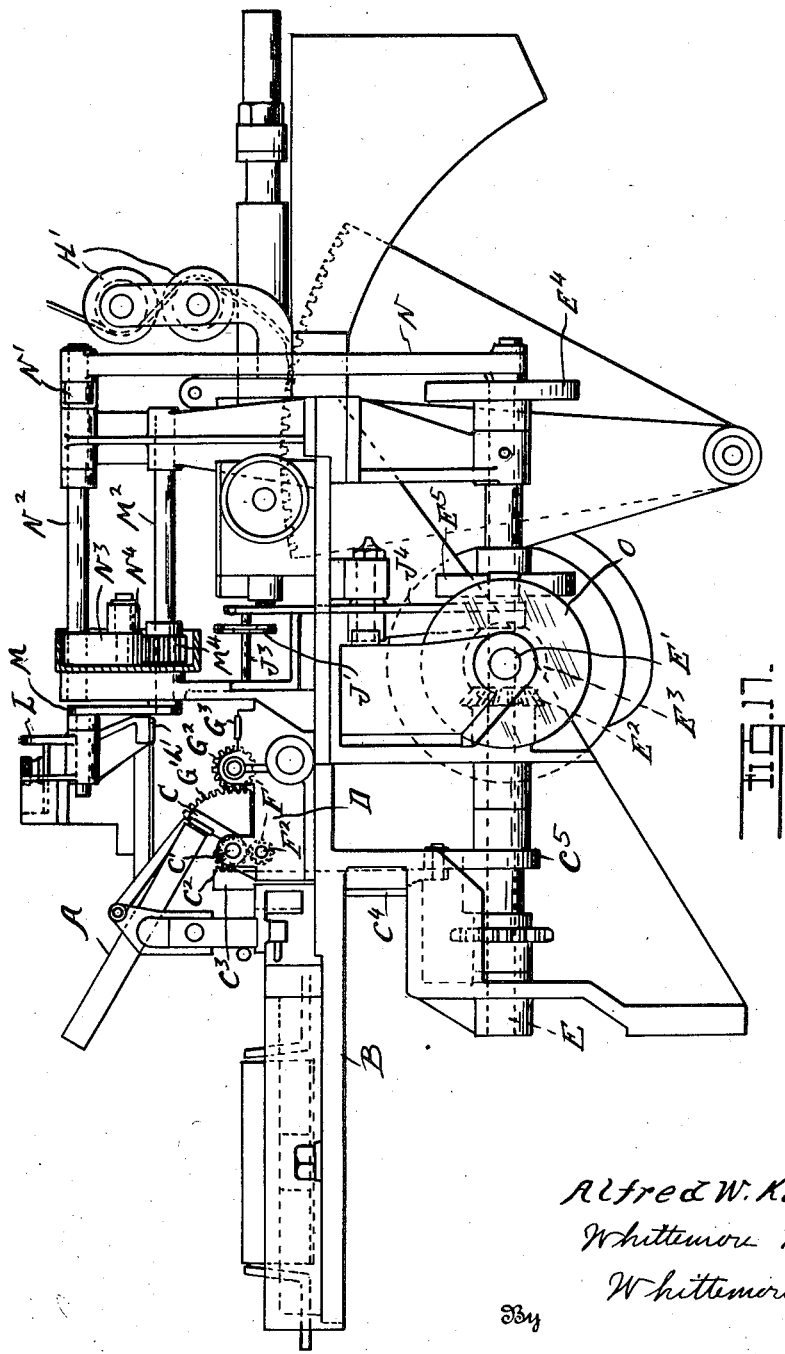
Inventor
Alfred W. Kath
Whittemore Hulbert
Whittemore & Belknap
By
Attorneys

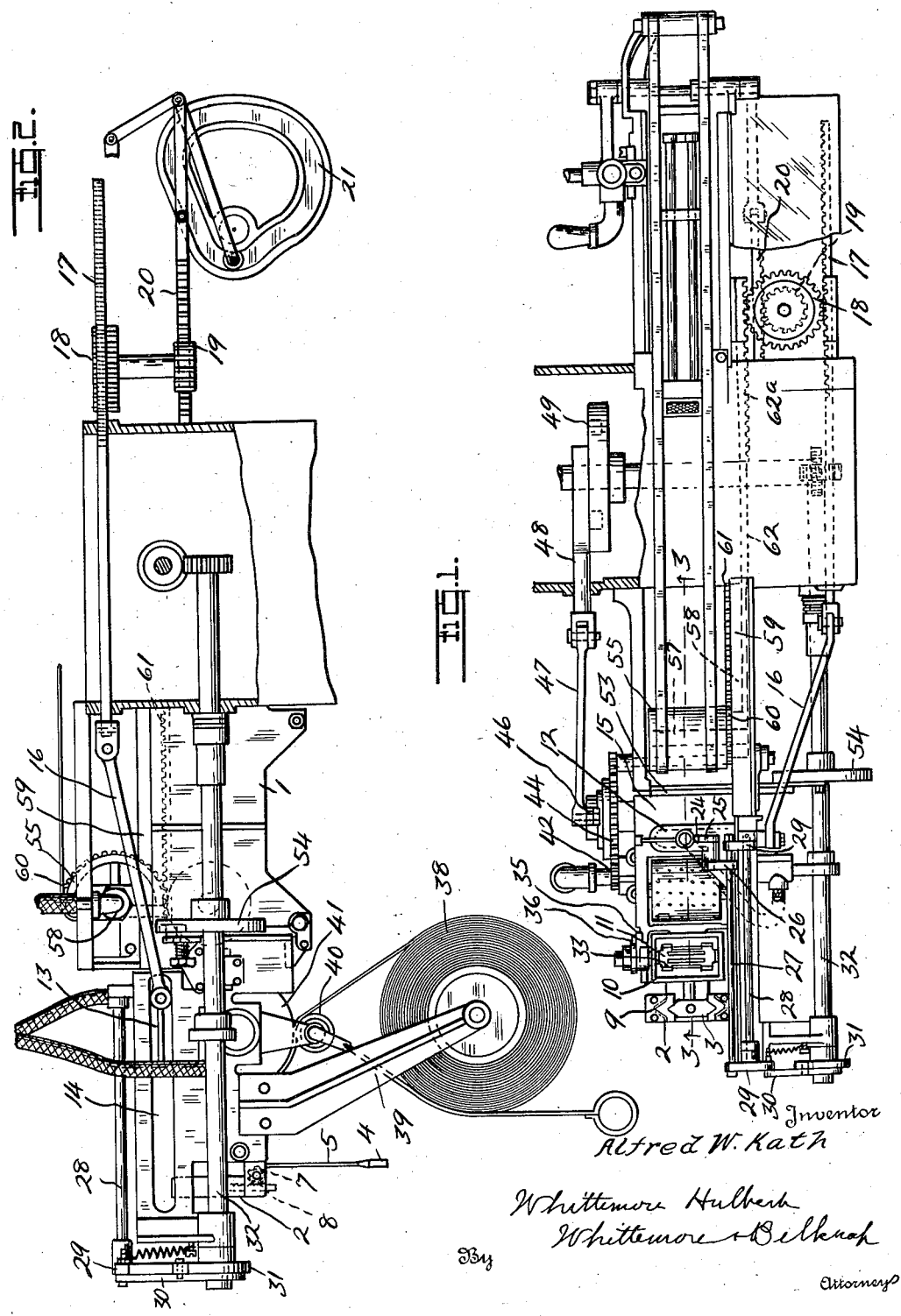

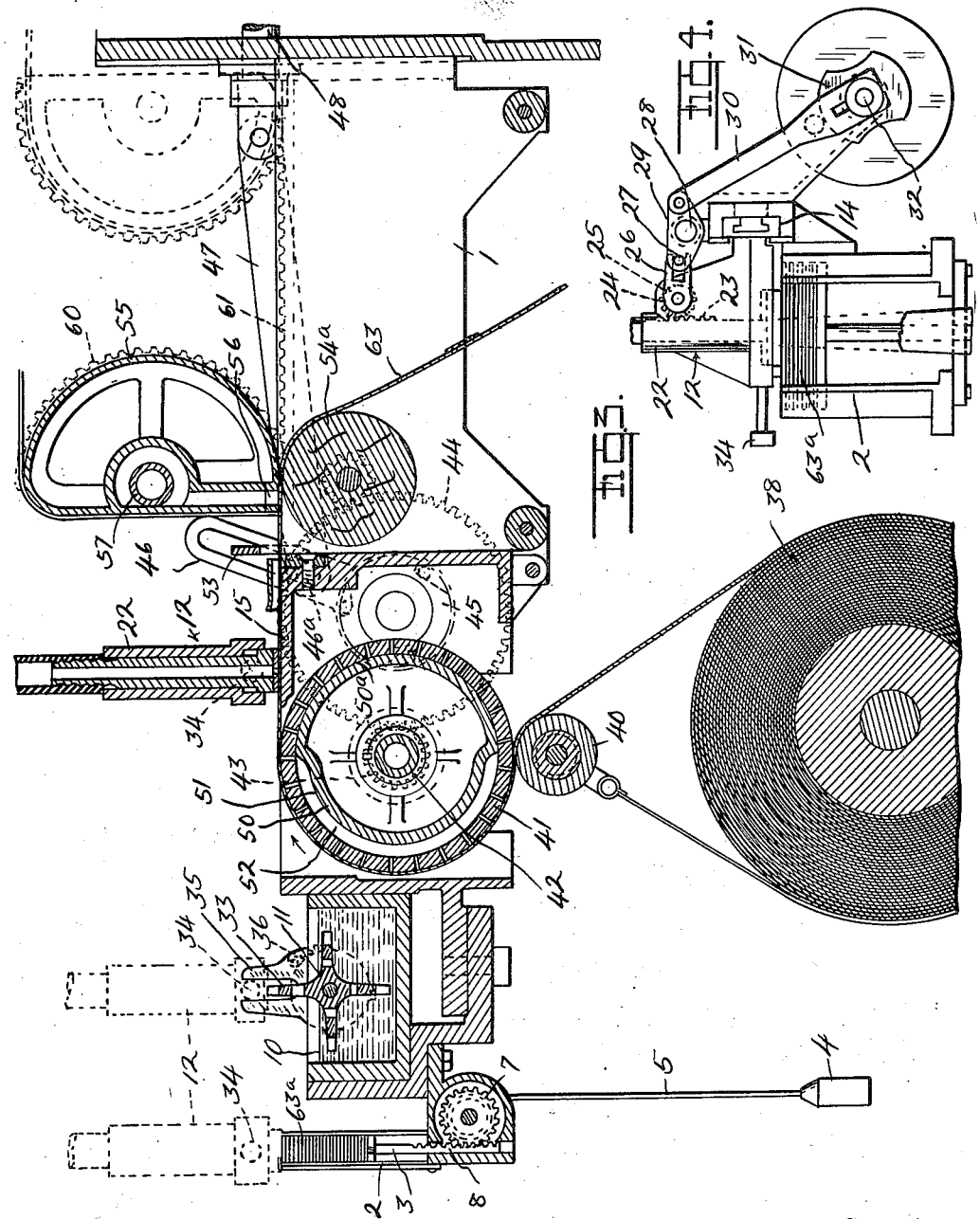

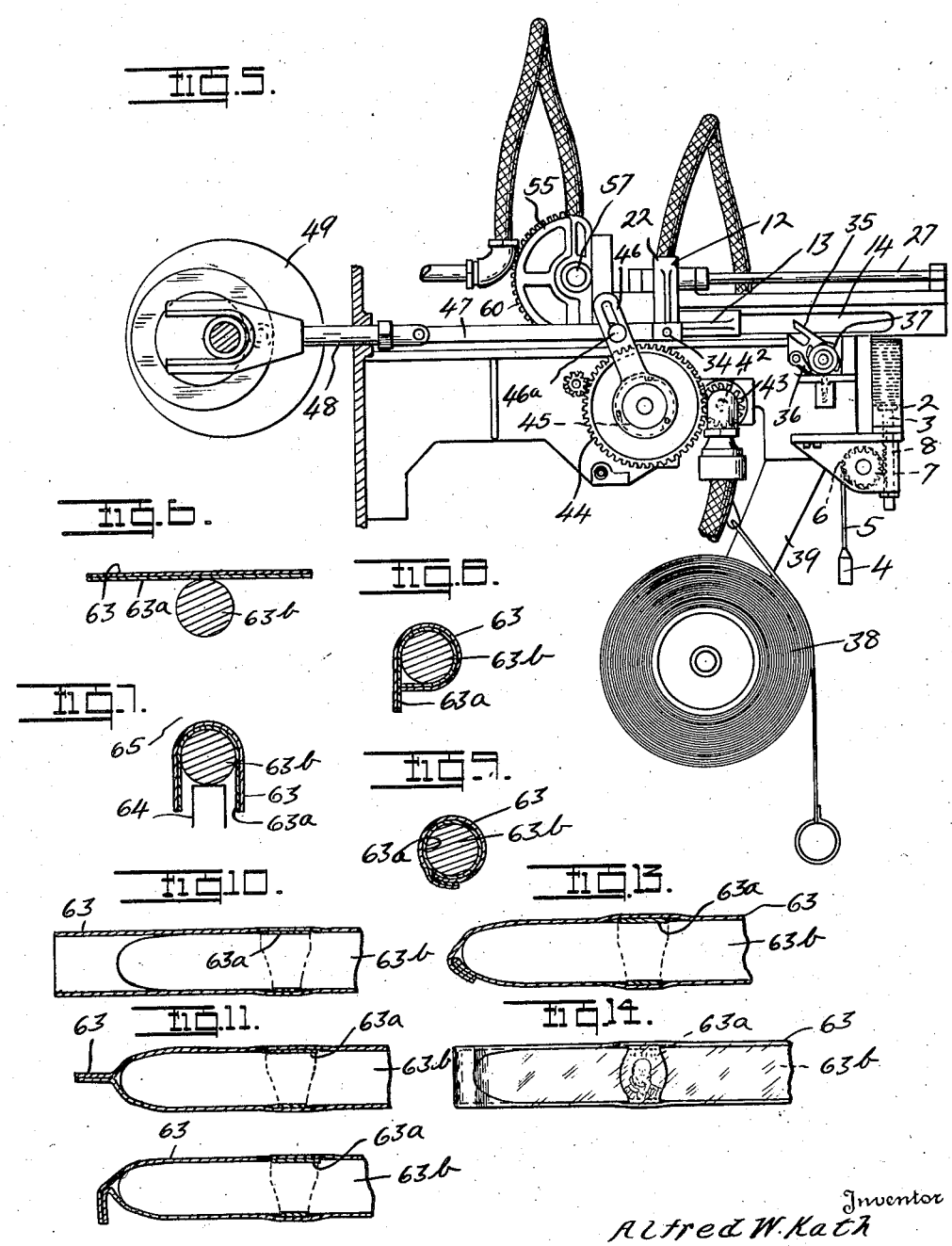

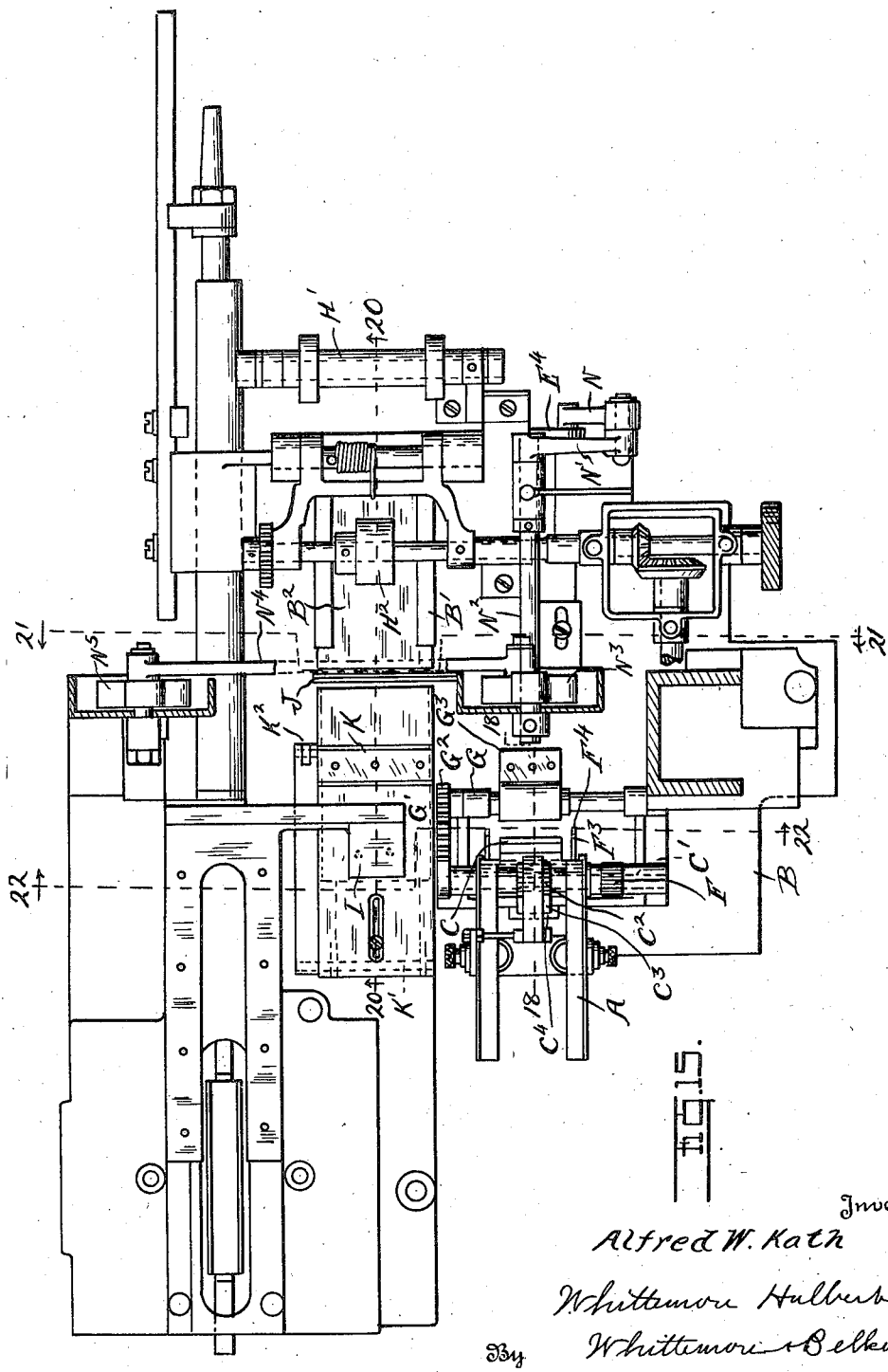

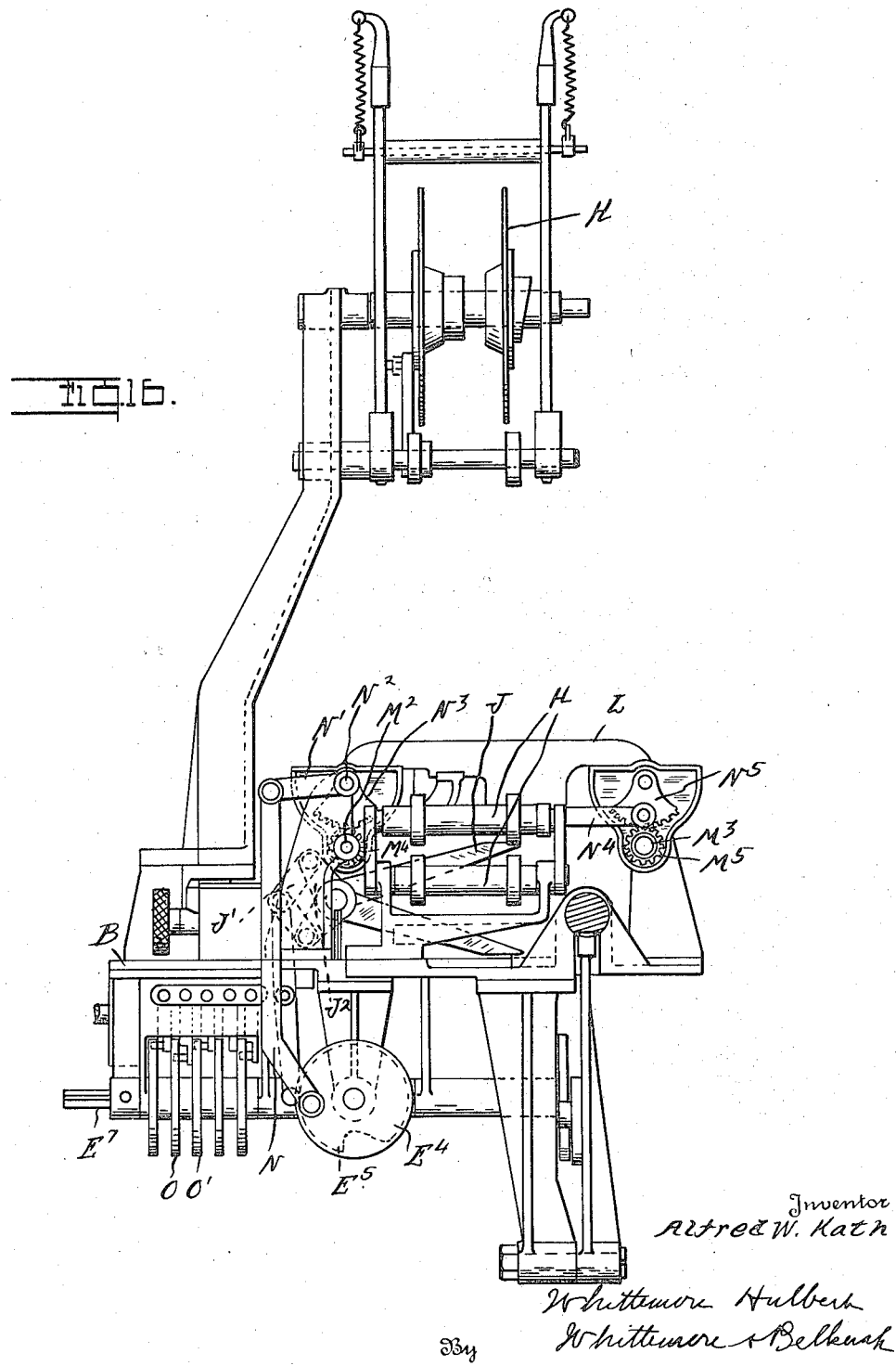

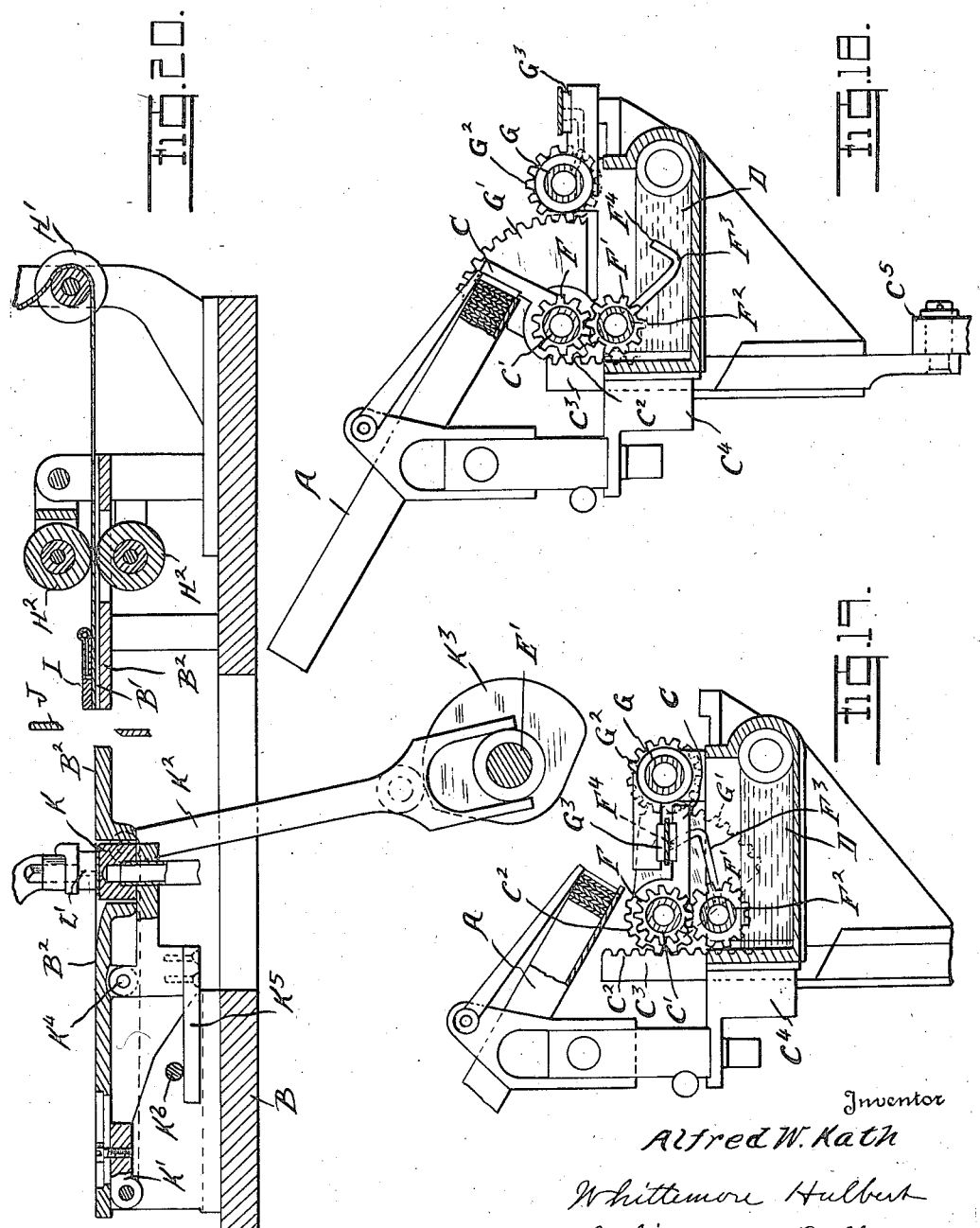

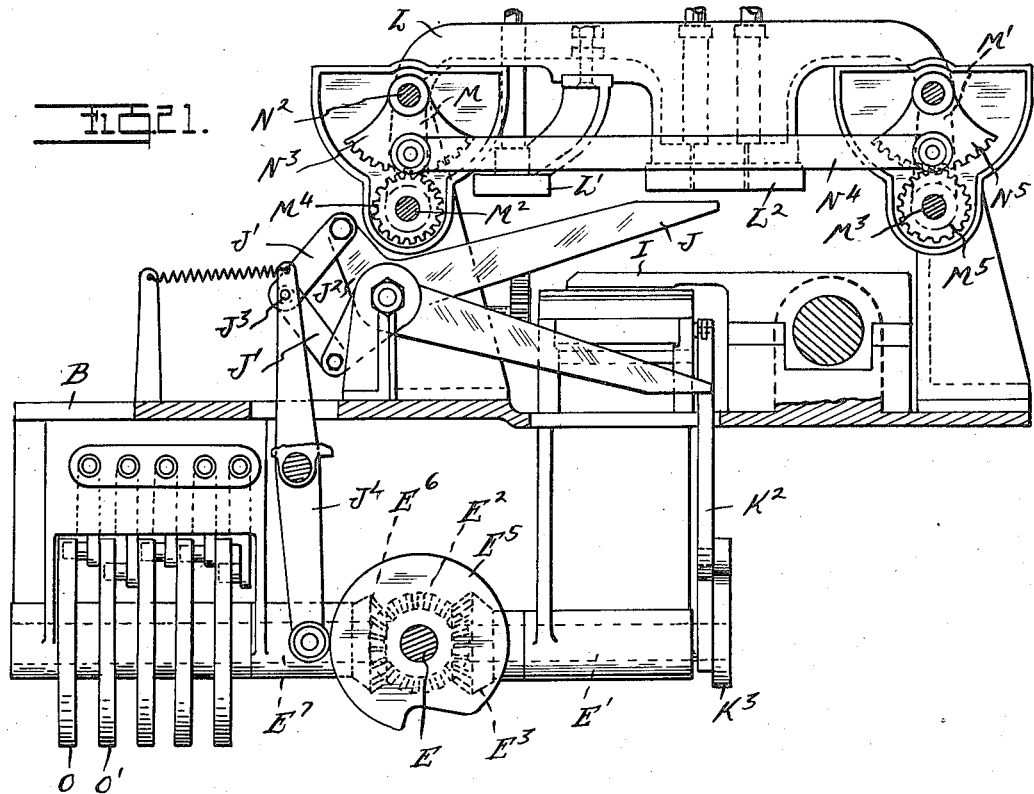
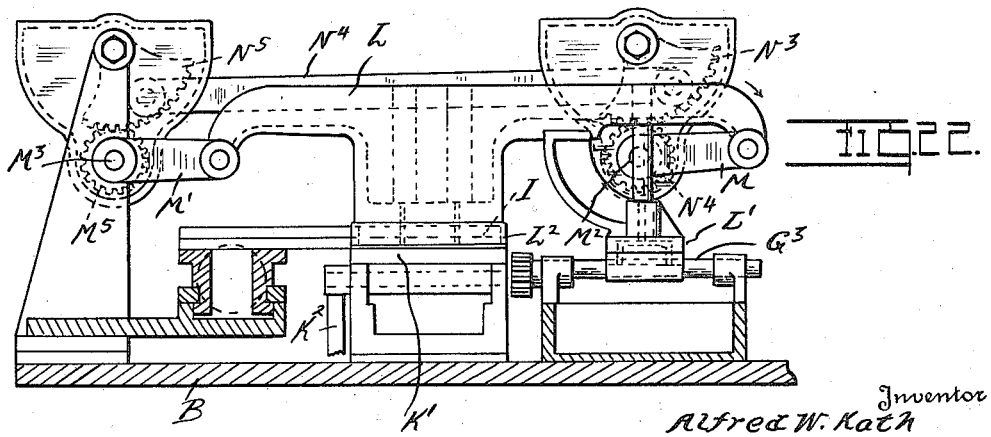

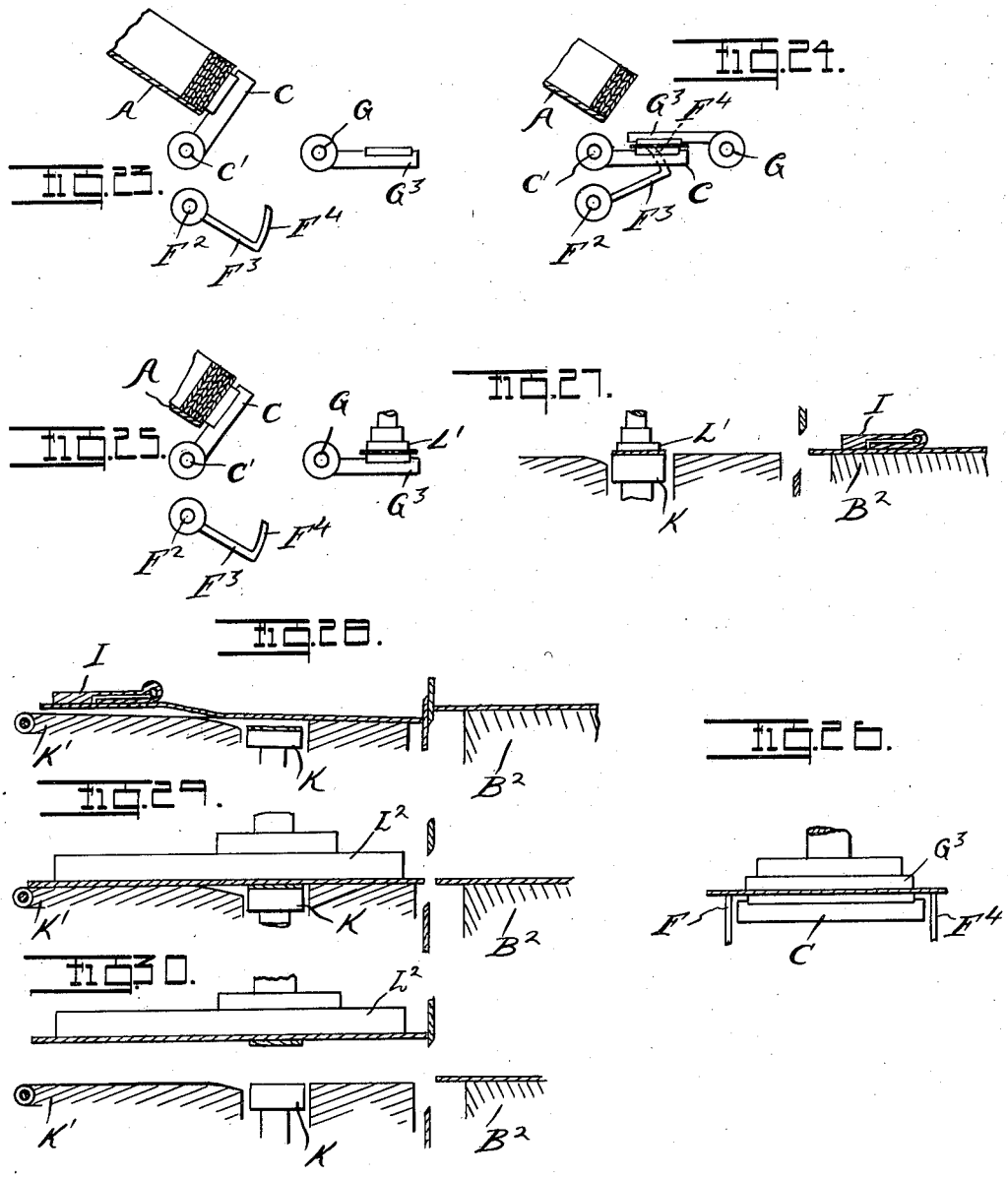

Patented Nov. 24, 1936

2,061,968

UNITED STATES PATENT OFFICE 2,061,968

METHOD AND APPARATUS FOR COMBINING WRAPPERS AND BANDS FOR CIGARS

Alfred W. Kath, Detroit, Mich., assignor to Arthur Colton Company, Detroit, Mich., a corporation of Michigan Application March 27, 1933, Serial No. 663,079

7 Claims. (Cl. 216—55)

The invention relates to the art of banding and wrapping cigars and more particularly to the application of transparent wrappers to cigars through which the bands are visible. For many years it has been customary to apply to certain grades of cigars ornamental label bands. These are wrapped around the cigar body and have gummed overlapping ends attached to each other. Before using the cigar the band is slipped off but it has been found that frequently in removing the band the outer leaf of the cigar is injured. Cigars have also been protected by various forms of wrappers and in recent years it has been customary to use transparent wrappers of the material commercially known as "cellophane". The label band is plainly visible through this transparent wrapper which thus forms a protection for the band as well as for the cigar. It has, however, been customary to apply the bands and wrappers separately and by the operation of different machines.

It is the primary object of the invention to simplify the process by the simultaneous application of the band and wrapper to the cigar. It is a further object to locate the band in the usual position surrounding the cigar body but without attachment of the ends to each other or to the outer leaf of the cigar. Still further it is an object of the invention to dispense with the use of a separate banding machine and to perform all of the operations by a single unit. With these objects in view the invention consists, First, in the novel construction of a combined wrapper and band adapted for application to the cigar by the usual operation of a cigar wrapping machine;

Second, the method of forming the wrapper and applying the band thereto;

Third, the mechanism by which this method is automatically performed;

Fourth, the novel package in which the cigar is surrounded by a transparent wrapper with a band inside the wrapper, visible therethrough and located in the usual position around the cigar body without independent attachment thereto.

My combined wrapper and band may be applied to the cigars by any suitable construction of wrapping machine and it is therefore unnecessary to illustrate and describe such machine or the operation thereof. It is, however, essential that the band should be accurately located with respect to the wrapper and so attached thereto that the ornamental face will be in contact with the inner face of the transparent wrapper. It is also important that the wrapper should be cut from the cellophane strip so that the grain of the material extends longitudinally of the cigar, while the band extends transversely to the grain. As cellophane is transparent the grain is scarcely visible, but it is nevertheless a fact that there is a greater tendency for the material to wrinkle transversely of the grain than longitudinally thereof, so that a better quality of wrapper is produced with the grain extending longitudinally of the cigar.

The mechanism for forming the wrappers and applying the bands thereto may if desired be incorporated in the construction of the wrapping machine, or it may be formed as a separate unit attached to and timed with the wrapping mechanism. I shall therefore illustrate and specifically describe only the means for forming the wrapper with the band attached thereto, ready for delivery to the wrapping mechanism and will indicate diagrammatically the subsequent operations of wrapping the cigar without illustration of the mechanism through which they are performed.

In the drawings:

Fig. 1 is a plan view of one construction of machine for forming the wrapper and applying the band thereto;

Fig. 2 is a side elevation thereof;

Fig. 3 is an enlarged section on line 3—3 of Fig. 1;

Fig. 4 is an end elevation of the left end of Fig. 1;

Fig. 5 is an elevation of the opposite side of the machine from that shown in Fig. 2;

Figs. 6, 7, 8, 9, 10, 11, 12, and 13 are diagrams illustrating the wrapping of the cigar with the combined wrapper and band;

Fig. 14 is a plan of the complete package;

Fig. 15 is a plan view of a modified construction of machine;

Fig. 16 is an end elevation thereof;

Fig. 17 is a side elevation;

Fig. 18 is a section on line 18—18 of Fig. 15;

Fig. 19 is a similar view showing the parts in a different position of adjustment;

Fig. 20 is a section on line 20—20 of Fig. 15;

Fig. 21 is a section on line 21—21 of Fig. 15;

Fig. 22 is a section on line 22—22 of Fig. 15;

Figs. 23 to 30 inclusive are diagrams illustrating the operation.

Band handling mechanism

As illustrated in Figs. 1 to 5 I show one embodiment of my invention in which 1 is a suitable frame preferably part of the frame of the wrapping machine; 2 is a holder for a stack of bands arranged at the outer end of the frame 1 and provided with a follower 3 for feeding the bands upward in said holder actuated by a weight 4, flexible cord 5, drum 6, gear wheel 7 and rack bar 8 on the shank of the follower. The bands are placed in the stack with the ornamental face downward and at the upper end of the holder are retained from accidental displacement by knife edged blades 9 which cut into the opposite ends of the upper bands in the stack and frictionally resist movement thereof. Adjacent to the holder 2 there is supported upon the frame 1 a tank 10 for holding a liquid adhesive and within this tank is a rotary adhesive applier 11. 12 is a suction head which is mounted on a carriage 13 slidable in guideways 14 upon the frame 1, said carriage being reciprocated to move the head 12 from a position in registration with the holder 2 to a position where it is above a table 15 on the frame. This table is adapted to receive the "cellophane" wrapper by mechanism hereinafter described, and the arrangement is such that the suction head 12 will remove a band from the top of the stack and transfer it to a position above the table. It is necessary, however, to raise the suction head after it is contacted with the upper band so as to lift the latter to clear the holder, and at the opposite end of the movement of the carriage to lower the head and press the band in contact with the wrapper. It is further necessary to apply adhesive to the opposite ends of the band while it is passing over the tank 10 so that when pressed upon the wrapper it will adhere thereto. These various operations are performed by mechanism of the following construction:

The carriage 12 is actuated by a rod 16 which is operated by mechanism timed with the mechanism of the wrapping machine. I have illustrated this mechanism as including a rack bar 17 connected to the rod 16 which is in mesh with a pinion 18 mounted on the frame, said pinion being rotated by a second pinion 19 of smaller diameter actuated by a rack bar 20 which in turn is actuated by a cam 21. This cam which is incorporated in the mechanism of the wrapping machine is adapted to make one revolution for each cycle of said machine and is fashioned to impart a reciprocating motion to the rack 20 during a portion of this cycle. This imparts a reciprocating movement of greater amplitude and faster speed to the rack bar 17 which through the rod 16 communicates similar movement to the carriage 13.

The vertical movement of the suction head 12 is effected by slidably mounting the same in a bearing 22 on the carriage 13 and providing a rack shank 23 which is engaged by a gear segment 24 on a rock shaft 25, all of which parts are mounted on the carriage. The rock shaft 25 has a forked rock arm 26 thereon extending oppositely from the gear segment 24 and slidably engaging a rod 27 extending parallel to the guideways 14. The rod 27 forms a part of the rockable frame mounted on the guideways 14 and including a rock shaft 28 and rock arms 29 at opposite ends thereof. One of these rock arms is oscillated by a rod 30 which engages a cam 31 on a rotatable shaft 32 which is driven from the wrapping machine by mechanism (not shown) that imparts a single rotation to the shaft for each cycle of said wrapping machine. Thus by suitably fashioning the cam 31 the rod 27 is raised and lowered at certain points in the cycle and is timed with the reciprocation of the carriage 13 so that the suction head will be lowered into contact with the band when it is in registration with the holder 2; will then be raised to detach a band from the stack, and while in this raised position will be moved with the carriage to a position over the table 15 and will then be lowered to press the band in contact with the wrapper on said table.

During transit from one position to the other, the band is carried over the tank 10 and has adhesive applied thereto by the member 11. This member is in the form of a star wheel having a plurality of blades 33 and the lower members of which are beneath the fluid adhesive while the upper member stands in the path of the band. The suction head 12 engages the central portion of the band, leaving the end portions projecting beyond the opposite sides of the head, which end portions contact with the ends of the upstanding blades 33 and have adhesive carried by said blade applied thereto. The contacting portions of the blades are moved at the same speed that the band is moved by the suction head, this being effected by the rotation of the member 11. Such actuation is caused by a pin 34 projecting laterally from the head 12 and engaging a forked arm 35 pivoted on the shaft of the member 11. This arm 35 has a pawl 36 engaging a ratchet wheel 37 on the shaft of the member 11, the arrangement being such that the reciprocation of the head 12 will cause a rocking movement of the forked arm 35 which when the head is carrying the band over the tank 10 will rotate the member 11 and blades 33 through the medium of the pawl 36 and ratchet wheel 37. This applies the adhesive to the band while during the return movement of the head the arm 35 only is actuated, the pawl being moved into engagement with another tooth of the ratchet wheel.

*Wrapper forming mechanism*

The "cellophane" stock from which the wrappers are formed is a rolled strip with the grain running longitudinally thereof. The roll 38 is mounted on an arm 39 depending from the frame 1 and the end of the strip passes upward therefrom over a roll 40 to a perforated hollow feed drum 41. This drum is intermittently driven in the direction of the arrow through the medium of a shaft 42, a pinion 43 on said shaft, and a gear wheel 44 in mesh with said pinion. The gear wheel is intermittently actuated by a ratchet wheel 45 operated by a lever 46 connected by a link 47 with a rod 48. This rod in turn is actuated from the mechanism of the wrapping machine which is diagrammatically illustrated as a cam 49. Thus the motion imparted by this cam to the mechanism described will give an intermittent rotary movement to the perforated hollow drum 41, and the amount of this movement is determined by the connection between the link 47 and the lever 46. This lever is slotted so as to permit adjustment of the pivotal connection 46a to the link outward or inward thereon, thereby diminishing or increasing the amplitude of each intermittent movement of the hollow roll.

Within the hollow feed drum 41 is a hollow head 50 having a portion of its periphery 50a in contact with the inner wall of the drum while another portion 51 is spaced from said inner wall to form a segmental air chamber 52 therebetween. This chamber is connected with a source of vacuum so that when the "cellophane" strip is fed from the roll 38 in contact with the drum 41, the perforations in said drum communicating with the chamber 52 will hold the "cellophane" strip in frictional contact with the peripheral face. The table 15 is arranged tangent to the drum 41 in the portion thereof which is in contact with the head 50. This cuts off the suction from the "cellophane" strip before it reaches the table 15 and permits it to be fed over said table into the position where the band is to be applied thereto.

*Severing and delivery mechanism*

To sever the wrapper from the "cellophane" strip, shears 53 are arranged to operate through a slot in the table 15. These shears are actuated from the shaft 32 by a cam 54 engaging one of the shear blades and the timing is such that when the band is being pressed down upon the "cellophane" strip on the table 15 by the suction head 12, the shears will be operated to sever the strip in advance of the suction head. The succeeding feeding operation of the strip by the hollow drum 41 will advance the portion of the strip to which the band has just been attached over a feed roll 54$^a$ whereupon a succeeding operation of the shears will sever the wrapper with the attached band from the strip. This completes the operations of forming the wrapper with the attached band and the handling of the wrapper from this point depends upon the specific character of wrapping machine to which my improved mechanism is applied. As illustrated in Figs. 1 to 4, the severed wrapper with the band attached thereto is reversed in position so as to place the band on the under side, this being accomplished by a segmental drum 55 arranged above the feed roll 54$^a$ and the wrapper resting thereon. The segmental drum 55 has a suction head 56 which when suction is applied will cause the rear end portion of the wrapper to adhere thereto. The drum 55 is then rolled over the table 15 to complete a half revolution which reverses the wrapper and raises it to a higher plane from which it is delivered to the wrapping mechanism. This movement of the drum is effected by mounting its shaft 57 in a carriage 58 slidable in ways 59. A gear 60 having a pitched diameter the same as the circumference of the drum is also mounted on the shaft 57 and engages a stationary rack 61. The carriage 58 is also connected to a rod 62 having a rack portion 62$^a$ which engages the pinion 18 on the diametrically opposite side thereof from the point of engagement of the rack bar 17. Thus the rotation of the pinion 18 by actuation of the gear wheel 19, rack bar 20 and cam 21, as previously described, not only actuates the rack bar 17 to move the carriage 13 and suction head 12, but also simultaneously actuates the rack bar 62 and carriage 58, while the stationary rack 61 engaging the gear wheel 60 rotates the drum 55 as previously described.

*Complete operation*

It will be understood that the mechanism above described is associated with and timed in relation to the operation of the wrapping machine (not shown) which, however, is diagrammatically illustrated in Figs. 6 to 14 and performs the following operations:

The wrapper 63 with the band 63$^a$ attached thereto and upon the under side thereof, is delivered above a cigar 63$^b$ in the wrapping machine. The cigar and wrapper are then raised upward by an elevator 64 between a pair of jaws 65 which bends the wrapper into a U-shaped form. The depending portions of the wrapper are then tucked beneath the cigar as shown in Figs. 8 and 9 to form a tube after which the ends of the tube are tucked and folded as shown in Figs. 10 to 13. Sealing is effected by passing the overlapped portions of the wrapper in contact with a heating means (not shown) which softens the wax coating of the cellophane which acts as an adhesive. Thus in the complete package shown in Fig. 14 the band 63$^a$ surrounds the body of the cigar within the wrapper 63 and the ornamental face of the band is plainly visible through the wrapper.

*Modified construction*

In Figs. 15 to 22 a modified construction is illustrated which performs essentially the same functions through different mechanism.

*Band applying mechanism*

In this construction the bands are in a holder A which is mounted upon a frame B and is held in inclined position to deliver the bands at its lower end. C is a suction head mounted on a rock shaft C′ which is above a tank D containing the adhesive fluid, C$^2$ is a gear segment on the shaft C′ which is engaged by a rack bar C$^3$ vertically slidable in guideways C$^4$ and actuated by an eccentric C$^5$ on a shaft E. Upon the shaft C′ is a gear wheel F which intermeshes with a gear wheel F′ on a shaft F$^2$ below and parallel to the shaft C′. The shaft F$^2$ has mounted thereon spaced arms F$^3$ terminating in upwardly extending hooked fingers F$^4$ which are normally immersed in the liquid adhesive within the tank D. The arrangement is such that the movement of the rack bar C$^3$ will partially rotate the shaft C′ in one direction and simultaneously rotate the shaft F$^2$ in the opposite direction. Thus when the rack bar C$^3$ is moved downward the suction head C is rocked upward into an inclined position (Fig. 18) where it contacts with the lowermost band in the holder A, while the movement of the rack bar C$^3$ in an upward direction will rock the suction head C downward to a substantially horizontal position above the tank D (Fig. 19). Simultaneously with the upward movement of the suction head C the fingers F$^4$ on the arms F$^3$ are moved downward into the adhesive fluid while during the downward movement of the suction head carrying the band thereon the fingers F$^4$ will be moved upward and these fingers are so positioned as to pass upward on opposite ends of the suction head and contact with projecting end portions of the band (Fig. 26). Thus the adhesive which is on the end of the fingers will be applied to the lower face of the band (which is the ornamental face) and without danger of smearing any other parts of the mechanism.

Arranged parallel to the shaft C′ and in substantially the same horizontal plane is a shaft G. This is actuated from the shaft C′ through the medium of gear segments G′ and G$^2$ respectively on the shaft C′ and G. G$^3$ is a suction head mounted upon the shaft G. The radius of the gear segment G′ is greater than that of the gear segment G$^2$ so that the rotation of the shaft C′ through an angle of 60° will impart to the shaft G a rotation of 180°. This will cause the suction head G$^3$ to move from an upward facing position to a downward facing position in contact with the suction head C when the latter is in horizontal position, thereby permitting the transfer of the band to which the adhesive has been applied and reversing its position so that the adhesive is then upon the upper face.

Wrapper feeding mechanism

The "cellophane" for the wrappers is in the form of a rolled strip as previously described, which is mounted on a reel H above the frame B. From this reel the strip passes around idler rolls H' and between feed rolls H² and then horizontally through guides B' over a table B². The feeding of the strip is effected by said feed rolls in conjunction with a reciprocating suction head I which engages the portion of the strip in the guides B' and draws it over the table a sufficient distance for the length of a wrapper. Shears J are arranged in a slot in the table and are operated to sever the strip after advancement of the same by the suction head I.

Transfer means

In the portion of the table B² over which the strip is advanced there is arranged a suction head K which engages a recess in the table. This table is adapted to be raised and lowered by mounting the same on a rockable frame K' to which is connected a rod K² actuated by a cam K³ on the shaft E'. The suction head K is pivotally mounted at K⁴ on the frame K' and is provided with an oppositely extending arm K⁵ which in the raised position of the table contacts with a stop K⁶ to hold said suction head in alignment with the table. The suction head K is also aligned transversely of the direction of advancement of the strip with the suction head G³ when the latter is in its up-facing position and after reversing the band carried thereby. The band is transferred from the suction head G³ to the suction head K by a carrier member L which also is provided with a suction head L' alternately registering with said suction heads G³ and K. This carrier member L is supported upon parallelly arranged rock arms M and M' mounted on rock shafts M² and M³ and the arrangement is such that the rocking of said shafts through an angle of 180° will move the suction head L' through an arcuate path from its position in registration with the suction head G³ to its position in registration with the suction head K. This will cause the lifting of the band off the former and transfer it to the latter, it being understood that in all of these transfer operations by suction heads the suction on the one head is relieved prior to the removal of the band therefrom by another head. The carrier L has another suction head L² so positioned thereon that when the suction head L' is registering with the suction head G³, the suction head L² is registering with the portion of the table B² over which the "cellophane" strip is advanced by the reciprocating suction head I. The timing of the movement of these parts is such that when the suction head L' has transferred the band into registration with the suction head K, the latter will be raised by the cam K³ into contact with said head L', and that while the suction head L' is moved back into registration with the head G³, the suction head K will be lowered to be out of the path of the advancing "cellophane" strip. The advancement of this strip by the reciprocating suction head I is completed by the time that the suction head L² is registered with the strip at which time the suction head K is again raised, pressing the band with its adhesive coated ends against the under side of the cellophane and the head L². Thus the band will be affixed to the wrapper which is severed from the strip by the shears J and during the next transfer movement of the carrier both wrapper and attached band will be removed from the table B² to a position for handling by the wrapping mechanism. As this wrapping mechanism differs in different machines to which my improvement may be applied and as the operations have already been briefly described, further description is unnecessary.

Operating mechanism

The various instrumentalities above described are all operated in properly timed relation by a common mechanism of the following construction:

On the frame B below the level of the table B² are mounted the shafts E and E' previously described, which extend in transverse directions to each other and are connected through the medium of bevel gear wheels E², E³ to run at the same angular speed. The shaft E has at its outer end a crank E⁴ which is connected by a rod N to a rock arm N' on a rock shaft N² arranged parallel to and in the vertical plane of the shaft M². A gear segment N³ is mounted on the shaft N² and is in mesh with a pinion M⁴ on the shaft M² so that the rotation of the crank E⁴ through the medium of the rod N, rock arm N', shaft N², gear segment N³ and pinion M⁴ will rock the shaft M² through an angle of 180°. A similar movement is imparted to the shaft M³ through the medium of a connecting rod N⁴ which couples the gear segment N³ with a similar gear segment N⁵ meshing with a gear wheel M⁵ on the shaft M³. Thus the oscillating movement of the carrier L previously described is obtained by this mechanism.

The shears J are actuated through the medium of toggle links J' connected to bell crank arms J² at the rear end of each shear blade. The connection between these toggle links J' is formed by a pivot pin J³ at the outer end of a lever J⁴ which is fulcrumed on the frame and has its lower end engaging a cam E⁵ on the shaft E. This cam is so fashioned and timed as to quickly operate the shares after the cellophane has been advanced to the position for receiving the band, thereby severing the wrapper from the remainder of the strip.

The shaft E' has mounted thereon the cam K³ which as previously described actuates the link K² to raise and lower the table B² and suction head K. In alignment with the shaft E' and also driven through bevel gear wheels E⁶ is a shaft E⁷ having mounted thereon a series of cams O, O', etc., which control valves for the various suction heads. Thus the suction is communicated to the several heads at the proper time so as to permit them to function as previously described.

What I claim as my invention is:

1. The process of making cigar wrappers consisting in bringing a transparent cigar wrapper and a cigar band in intimate contact with the colored face of the cigar band directed toward the transparent wrapper, with spaced spots of adhesive between them to secure the band to the wrapper, and applying pressure to adhesively attach the band to the wrapper.

2. The combination with means for feeding wrappers to a cigar wrapping machine, of a holder for a stack of bands, means for successively removing bands from said stack, transferring the same into predetermined registration with said wrappers with the face side of the band adjacent to the wrapper and pressed thereagainst, and means for applying adhesive to portions of the surface of said band during transit.

3. The combination with means for intermittently feeding a strip of wrapping material, of a holder for a stack of bands, means for successively removing bands from said stack and transferring the same to a position extending transversely of the strip with the face side of the band adjacent to and pressed into contact with said strip while the latter is stationary, means for applying adhesive to portions of the face side of said band during transit, and means for severing a wrapper from said strip with an adhering band in predetermined relation thereto.

4. The combination with means for intermittently advancing a strip of wrapping material, of a holder for a stack of bands, a receptacle for adhesive, means for successively removing wrappers from said stack and transferring the same face side downward above said receptacle, one or more oscillatory fingers for alternately dipping into the adhesive in said receptacle and for contacting with the face of said band to apply adhesive thereto, means for transferring the adhesive coated band to a position extending transversely of said strip and pressed in contact therewith while said strip is stationary, and means for severing said strip to form individual wrappers with the band affixed thereto in a predetermined position.

5. The combination with means for intermittently advancing a strip of wrapping material, of a holder for a stack of bands, a receptacle for adhesive, an oscillatory suction head for successively removing bands from said holder and holding the same above said receptacle with the face side downward, one or more oscillatory fingers for alternately dipping in the adhesive and applying the same to the band while held above said receptacle, and means for removing the band from said suction means and transferring the same to a position extending transversely of said strip while the latter is stationary and pressed into contact therewith, and means for severing the strip to form individual wrappers with the adhering band in predetermined position thereon.

6. The combination with means for intermittently advancing a strip of wrapping material, of a holder for a stack of bands, a receptacle for adhesive, an oscillatory suction head for successively removing bands from said stack and holding the same above said receptacle with the face side downward, one or more oscillatory fingers for alternately dipping in said adhesive and applying the same to said band, an oscillatory suction head for removing the band from said first mentioned suction head and for reversing the position of the same to face upward, band holding means adjacent to the path of said intermittently advancing strip of wrapping material, transfer means for the band from said reversing suction head to said holding means during the interval when said strip is stationary, means operating after the advancement of said strip to press the adhesive coated band into contact therewith and means for severing the strip with the adhering band in predetermined position thereon.

7. The combination with means for intermittently advancing a strip of transparent wrapping material, of a table over which said strip is fed, means for periodically raising and lowering said table, a band holding suction head on said table, a holder for a stack of bands, a receptacle for adhesive, an oscillatory suction head for successively removing bands from said stack and holding the same face downward above said tank, one or more oscillatory fingers for alternately dipping into the adhesive and applying the same to portions of said band, an oscillatory suction head for removing the band from said first suction head and for reversing the same to face upward, means for transferring the band from the latter suction head to the suction head on said table, timing mechanism whereby the band engaging said table suction head is lowered out of the path of said wrapper strip during the advancement of the same and is raised and pressed into contact with said strip while stationary, and severing means for cutting a wrapper from said strip with the band in predetermined position thereon.

ALFRED W. KATH.